(12) United States Patent
Miyaishi

(10) Patent No.: US 9,616,882 B2
(45) Date of Patent: Apr. 11, 2017

(54) HYBRID VEHICLE CONTROL DEVICE

(71) Applicants: JATCO Ltd, Fuji-shi, Shizuoka (JP); NISSAN MOTOR CO., LTD., Yokohama-shi, Kanagawa (JP)

(72) Inventor: Hironori Miyaishi, Kawasaki (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 14/913,591

(22) PCT Filed: Sep. 4, 2014

(86) PCT No.: PCT/JP2014/073276
§ 371 (c)(1),
(2) Date: Feb. 22, 2016

(87) PCT Pub. No.: WO2015/037502
PCT Pub. Date: Mar. 19, 2015

(65) Prior Publication Data
US 2016/0207524 A1 Jul. 21, 2016

(30) Foreign Application Priority Data

Sep. 13, 2013 (JP) ................................. 2013-191097

(51) Int. Cl.
*B60K 6/48* (2007.10)
*B60W 20/30* (2016.01)
(Continued)

(52) U.S. Cl.
CPC ............ *B60W 20/30* (2013.01); *B60K 6/48* (2013.01); *B60K 6/543* (2013.01); *B60W 10/02* (2013.01);
(Continued)

(58) Field of Classification Search
CPC .................................. B60K 6/48; F16H 61/02
See application file for complete search history.

(56) References Cited

U.S. PATENT DOCUMENTS 6,335,573 B1 1/2002 Eguchi et al.
6,898,506 B2 * 5/2005 Kawai ...................... B60K 6/48
180/65.1

(Continued)

FOREIGN PATENT DOCUMENTS

EP 0 572 279 A2 12/1993
JP 8-312741 A 11/1996
(Continued)

*Primary Examiner* — Thomas Tarcza
*Assistant Examiner* — Alex C Dunn
(74) *Attorney, Agent, or Firm* — Foley & Lardner LLP

(57) ABSTRACT

A control apparatus for a hybrid vehicle includes a coast stop control section (60) which stops a fuel supply to an engine (E) when a vehicle speed is equal to or lower than a predetermined vehicle speed, an accelerator pedal is not depressed, a brake pedal is depressed, and a select position of a continuously variable transmission (1) is in a traveling position; and a low return control section (50) for retuning a transmission ratio of the continuously variable transmission (1) to a low side after the engine (E) is restarted in a case where the transmission gear ratio of the continuously variable transmission (1) is a midway ratio which is higher than a predetermined transmission gear ratio, when detecting that the coast stop control section (60) is operated and the vehicle is stopped.

4 Claims, 4 Drawing Sheets

(51) Int. Cl.
*B60K 6/543* (2007.10)
*B60W 10/02* (2006.01)
*B60W 10/06* (2006.01)
*B60W 10/10* (2012.01)
*B60W 20/00* (2016.01)
*F16H 61/02* (2006.01)
*F16H 61/662* (2006.01)
*B60W 20/10* (2016.01)
*B60W 30/18* (2012.01)

(52) U.S. Cl.
CPC ............ *B60W 10/06* (2013.01); *B60W 10/10* (2013.01); *B60W 20/00* (2013.01); *B60W 20/10* (2013.01); *B60W 30/18072* (2013.01); *F16H 61/02* (2013.01); *F16H 61/662* (2013.01); *F16H 61/66259* (2013.01); *B60W 2520/00* (2013.01); *B60W 2710/06* (2013.01); *B60W 2710/10* (2013.01); *Y10S 903/93* (2013.01); *Y10S 903/945* (2013.01)

(56) References Cited

U.S. PATENT DOCUMENTS

| | | | |
|---|---|---|---|
| 6,942,598 B2 * | 9/2005 | Kondo | F16H 61/143 477/169 |
| 7,316,630 B2 * | 1/2008 | Tsukada | F16H 61/66259 180/65.265 |
| 8,323,134 B2 * | 12/2012 | Tsukada | F16H 61/66259 474/144 |
| 8,762,011 B2 | 6/2014 | Ishida et al. | |
| 9,168,910 B2 * | 10/2015 | Onodera | F02D 29/00 |
| 2001/0016165 A1 | 8/2001 | Shimabukuro et al. | |
| 2012/0172175 A1 * | 7/2012 | Nedorezov | F02D 41/065 477/169 |
| 2016/0207524 A1 * | 7/2016 | Miyaishi | B60K 6/48 |

FOREIGN PATENT DOCUMENTS

| | | |
|---|---|---|
| JP | 9-014416 A | 1/1997 |
| JP | 2000-023313 A | 1/2000 |
| JP | 2001-088585 A | 4/2001 |
| JP | 2001-208177 A | 8/2001 |
| JP | 2006-170265 A | 6/2006 |
| JP | 2006-234043 A | 9/2006 |
| JP | 2008-179242 A | 8/2008 |
| JP | 2009-264475 A | 11/2009 |
| JP | 2010-190266 A | 9/2010 |
| JP | 2012-076740 A | 4/2012 |
| JP | 2012-197904 A | 10/2012 |
| JP | 2012-206663 A | 10/2012 |
| WO | WO-2013/058139 A1 | 4/2013 |

* cited by examiner

HYBRID VEHICLE CONTROL DEVICE

TECHNICAL FIELD

The present invention relates to a control apparatus for a hybrid vehicle in which a continuously variable transmission is mounted.

BACKGROUND ART

A patent document 1 discloses a conventional gear shift control apparatus for a continuously variable transmission. In this conventional control apparatus, a, so-called, low return control is executed in which, in a case where a transmission gear ratio (a speed ratio or a shift ratio) is not a lowest gear ratio, the gear shift ratio is modified to a speed reduction side when a vehicle speed is zero so that the vehicle is in a stopped state. Thus, a favorable acceleration performance is exhibited during a re-acceleration of the vehicle after the vehicle is stopped.

However, the following problem is present in the above-described gear shift control apparatus for the continuously variable transmission. Such a vehicle is present that a, so-called, coast stop control function, viz., a supply of fuel to an engine is stopped in a low vehicle speed traveling state in which an accelerator pedal is released and a brake pedal is depressed.

When both of the coast stop control and the above-described low return control are used together, the engine is stopped before the vehicle is stopped due to the coast stop control. Thus, during the vehicle stop, the continuously variable transmission is in a state in which the gear shift ratio is kept at the gear shift ratio higher than the lowest gear shift ratio. If the low return control is executed in this state, there is often a case where the engine needs to be restarted in order to secure a hydraulic pressure required for the low return control. There is a possibility of an overload applied onto a clutch when the engine is started during the low return control.

It is necessary to make a line pressure high in the low return control. When the engine is started to actuate the clutch in a high line pressure, a clutch actual pressure (denoted by a solid line in FIG. 4) with respect to a command pressure (denoted by a broken line in FIG. 4) generates a hydraulic pressure surge shown in an eclipse broken line after a dead time td. Consequently, the overload is applied to a damper of the clutch.

With the above-described problem in mind, it is an object of the present invention to provide a control apparatus for a hybrid vehicle which can prevent an action of an overload applied to the clutch so as to deteriorate the clutch in a case where the coast stop control of the engine and the low return control are used together.

PRE-PUBLISHED DOCUMENT

Patent Document

Patent document 1: A Japanese Patent Application First Publication (tokkai) No. Heisei 8-312741.

DISCLOSURE OF THE INVENTION

To achieve the above-described object, there is provided a control apparatus for a hybrid vehicle, the hybrid vehicle including an engine, a motor, a continuously variable transmission, a clutch disposed between the engine and the motor, and control means for controlling these, the control means includes: coast stop control means for stopping a fuel supply to the engine when the vehicle is traveling; and low return control means for returning a gear ratio of the continuously variable transmission to a low side during a vehicle stop after the engine is restarted during the vehicle stop, in a case where the transmission gear ratio of the continuously variable transmission is a transmission gear ratio which is higher than a predetermined transmission gear ratio, when detecting that the coast stop control means is operated and, thereafter, the vehicle is stopped.

Effect of the Invention

In the control apparatus for the hybrid vehicle according to the present invention, the transmission gear ratio is shifted toward the low side after the engine is restarted even if the gear (shift) ratio of the continuously variable transmission is placed at a high gear side, when the fuel supply to the engine is stopped according to the coast stop function. Thus, the deterioration of the clutch due to the action of the overload onto the clutch can be prevented.

EMBODIMENTS FOR CARRYING OUT THE INVENTION

Figure 1:
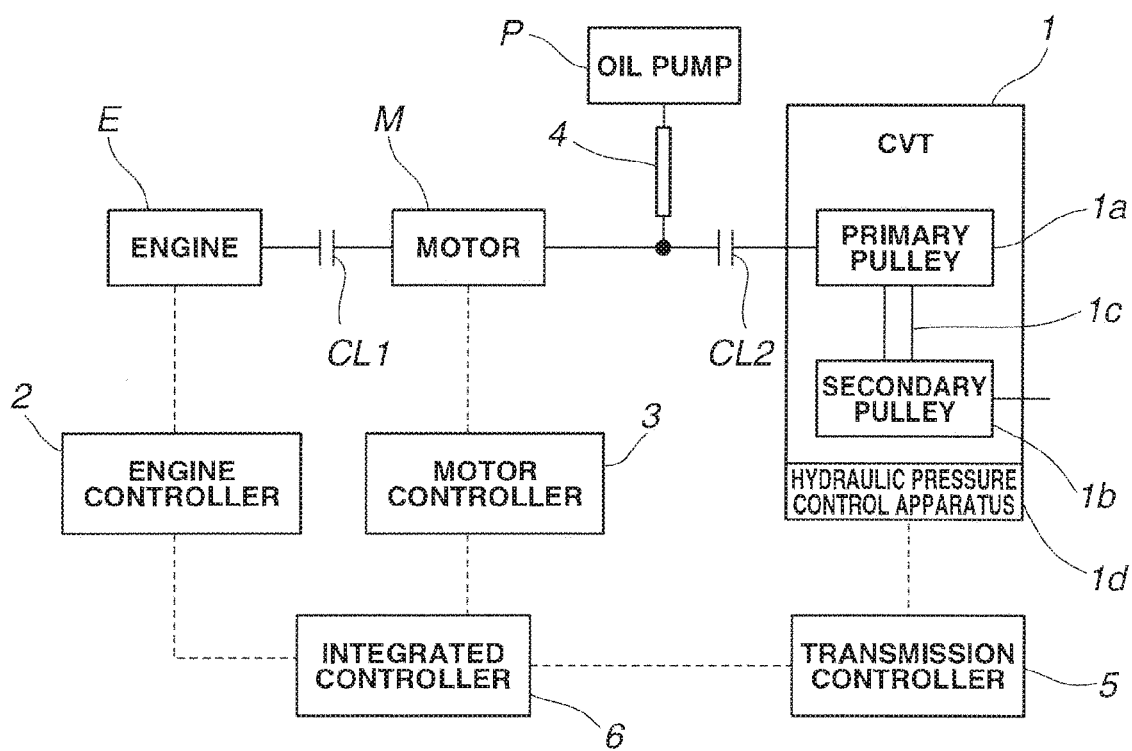
FIG. 1 is a diagrammatical view of a structure of a drive train of a hybrid vehicle in which a control apparatus of a first preferred embodiment according to the present invention and a continuously variable transmission are mounted.

Preferred embodiments according to the present invention will be described in details on a basis of a first preferred embodiment shown in the drawings.

First Embodiment

FIG. 1 shows a whole structure of a drive train of a hybrid vehicle in which a control apparatus in the first embodiment is mounted. The hybrid vehicle includes: an engine E; a motor M; an oil pump P; a first clutch CL1; a second clutch CL2; and a belt type continuously variable transmission (CVT) 1. The hybrid vehicle can selectively be traveled in an electric automotive vehicle mode (EV mode) in which the vehicle is driven according to an operation of motor M only and in a hybrid vehicle mode (HEV mode) in which the vehicle is driven according to both operations of engine E and motor M.

It should be noted that this hybrid vehicle is a series type hybrid vehicle. The HEV mode includes a mode in which engine E drives motor M, this motor M generates an electric power as a generator, and the vehicle is traveled while motor M charges a battery (not shown) and a mode in which a synthesized force between an output of engine E and the output of motor M due to an electric power supply from the battery drives the vehicle. These modes are selected in accordance with a traveling state and an electrical charge rate of the battery. As an example of these modes, a Japanese Patent Application First Publication No. 2012-206663 is, herein, listed.

Engine E is an internal combustion engine such as a gasoline engine in which fuel such as gasoline is combusted to output a driving force. Engine E is started, is operated, and is stopped through a control of a fuel supply quantity by engine controller 2.

Motor M is, for example, constituted by a three-phase alternating current motor. When an electric power from the battery is supplied via an inverter (not shown), the output of motor M can drive continuously variable transmission 1 and oil pump P. On the other hand, during a vehicle braking, motor M functions as a generator. A part of the braking energy is converted into an electrical energy. The inverter can convert its three phase alternating current into a dc current to charge the battery. In addition, as described above, it is possible for motor M to generate the electric power as a generator by driving motor M via engine E to charge the battery. Motor M is controlled by means of a motor controller 3 via the inverter.

Oil pump P is, for example, a vane type oil pump and is drivable by motor M via a chain 4 bridged over a sprocket installed on an input axle of oil pump P and a sprocket installed on an output axle of motor M. This oil pump P sucks oil within an oil pan of continuously variable transmission 1 and supplies the discharged oil to a hydraulic pressure control apparatus 1d of continuously variable transmission 1. The hydraulic pressure control apparatus 1d supplies regulated hydraulic pressure to an oil chamber of a primary pulley and performs a gear change and performs a lubrication and cool as an oil lubricating oil to movable parts of mechanical parts.

First clutch CL1 is a multiple plate type clutch and can be connected, disconnected, and slipped between engine E and motor M. This first clutch C1 is released in the EV mode and is clutched or slipped in the HEV mode.

Second clutch CL2 is another multiple plate type clutch and can be connected, disconnected, and slipped among motor M, oil pump P, and the input axle of continuously variable transmission 1. This second clutch CL2 is engaged in the EV mode and is slipped in an engaged state in the HEV mode in a case where first clutch CL1 is engaged so that an output of engine E and an output of motor M are synthesized to start the vehicle in a high load such as an abrupt start. In a case where the driving force in a re-acceleration is required, second clutch CL2 is completely engaged state. It should be noted that the control of first clutch CL1 and the control of second clutch CL2 are carried out by a transmission controller 5 in this embodiment.

Continuously variable transmission 1 is a well known transmission in which a metallic belt 1a is bridged between a primary pulley 1a linked to the input axle and a secondary pulley 1b linked to the output axle and a groove width between both pulleys 1a, 1b is varied in response to the hydraulic pressure from hydraulic pressure control apparatus 1d to enable to perform a continuously variable transmission. Hence, the detailed structure of continuously variable transmission 1 will, herein, be omitted. Continuously variable transmission 1 is executable a gear shift control carried out along a shift line determined according to an engine revolution number and a vehicle speed through transmission controller 5 and a coast stop control, a low return control, and so forth, as will be described later.

Engine controller 2, motor controller 3, and transmission controller 5 are controlled by means of an integrated controller 6. The low return control by transmission controller 5 related to the present invention will be described below on a basis of FIG. 2 from among these controllers 2, 3, 5, 6.

Figure 2:
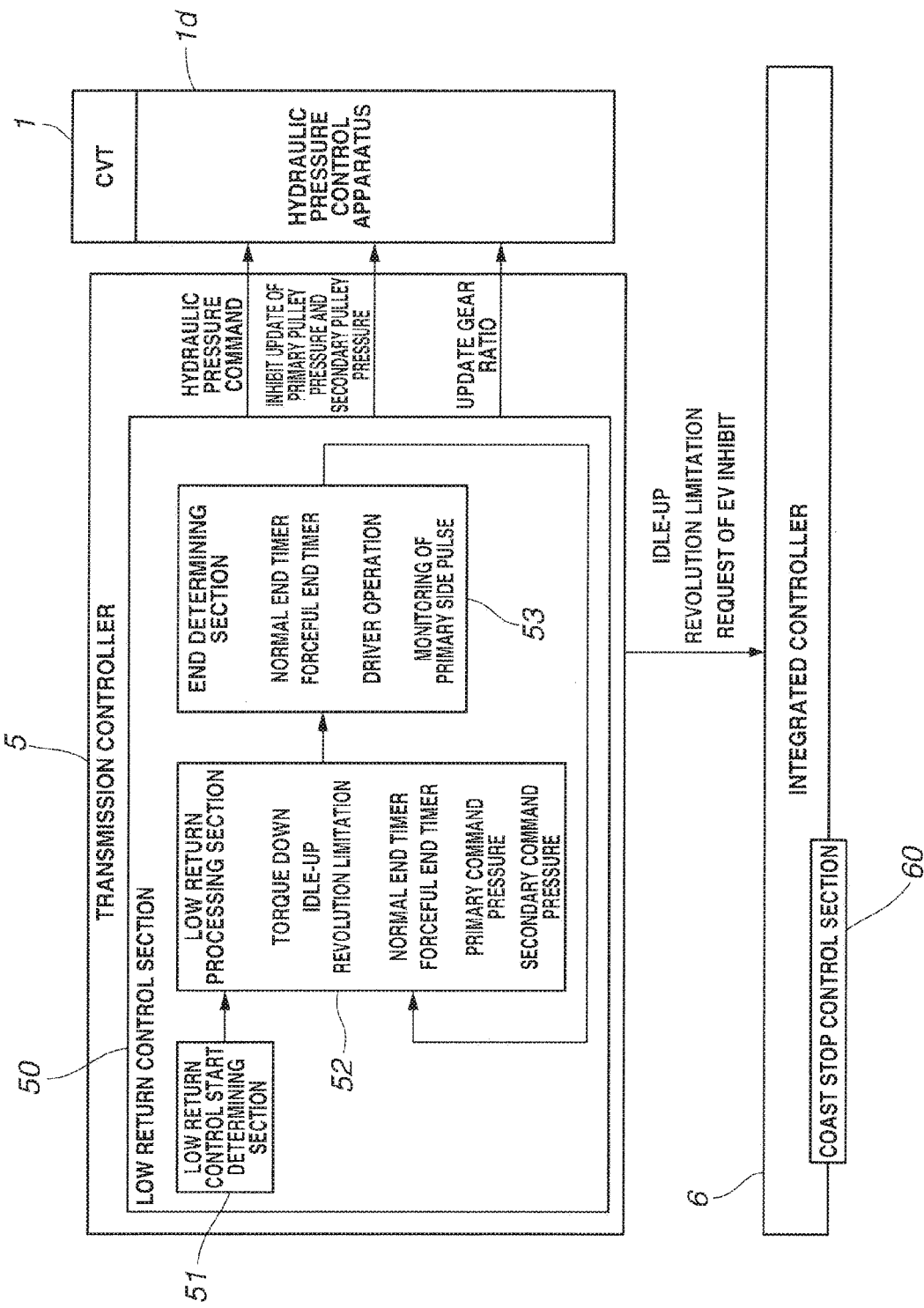
FIG. 2 is a block diagram representing a structure of the control apparatus in the first preferred embodiment.

As shown in FIG. 2, transmission controller 5 is provided with a low return control section 50 (corresponds to low return control means according to the present invention). When the vehicle is stopped after a fuel supply to engine E, during the deceleration of the vehicle, is stopped, the low return control to return a transmission gear ratio (or transmission speed ratio) to a lowest side in a case where the transmission gear ratio of continuously variable transmission 1 remains at a transmission gear ratio (called as RATIOT) higher than the lowest side (lowest transmission gear ratio) is carried out. This low return control section 50 includes a low return control start determining section 51, a low return processing section 52, and an end determining section 53.

Low return control start determining section 51 determines whether the low return control is executed or not. This low return control start determination is carried out in the following way. That is to say, when the condition as will be described later is established, low return control start determining section 51 detects that a coast stop control in which the fuel supply to engine E is stopped is carried out by a coast stop control section 60 (corresponds to coast stop control means according to the present invention) of integrated controller 6 and, thereafter, detects that the vehicle is stopped, a low return control start signal is inputted to low return processing section 52.

The condition of executing the coast stop control is that a select lever of continuously variable transmission 1 is operated in a traveling position, a brake pedal is depressed, an accelerator pedal is released, an oil temperature of continuously variable transmission 1 is within a predetermined range, and the vehicle speed is equal to or below a predetermined vehicle speed.

Low return processing section 52 allows the low return control upon receipt of the low return start signal from low return control start determining section 51, carries out an idle up with engine E started, and does not alter the transmission gear ratio during this period. Subsequently, during the next low return control interval of time, the hydraulic pressure of a hydraulic pressure chamber of primary pulley 1a is lowered and the hydraulic pressure of secondary pulley 1b is raised. This causes the belt to be longitudinally slipped from the primary pulley side to the secondary pulley side (at this time, since the pulley is not rotated, this is different from the shift during the traveling) so that the gear (shift) ratio is modified to the low side and the gear ratio is finally changed to the lowest position).

Hence, low return processing section 52 outputs respective command signals such as the start of engine E and idle up of engine E, and a limitation of the engine revolution numbers to integrated controller 6. In addition, signals of inhibiting the modification of the primary pulley pressure and the modification of the secondary pulley pressure are inputted from low return processing section 52 to hydraulic pressure control apparatus 1d.

Furthermore, at a time point at which a predetermined wait time is passed from a time of the input of the low return start signal, low return processing section 52 outputs signals of command pressure to the primary pulley and the command pressure to the secondary pulley to hydraulic pressure control apparatus 1d. Hydraulic pressure control apparatus 1d controls these. Low return processing section 52, at the same time, starts a time count at a normal end timer.

After the count time of the normal end timer passes a first predetermined time ts (refer to FIG. 3), a forceful end timer starts the count of time. It should be noted that first predetermined time ts is determined in accordance with a midway gear ratio RATIOT and is set to be longer as midway gear ratio RATIOT becomes a higher side. End determining section 53 determines whether the count time of the normal end timer passes first predetermined time ts. If first predetermined time ts has passed, an end signal is outputted to low return processing section 52 to stop the low return control from low return processing section 52. In addition, when the count time of the forceful end timer is determined to be passed through a second predetermined time tf, the output to the low return control from the low return processing section 52 is forcefully stopped to return to a target signal before the low return control. It should be noted that, in a case where the timer count does not reach to the first and second predetermined times, the above-described outputs are continued form the low return processing section 52.

In a case where end determining section 53, further, detects that the operation of the select lever by the driver is other than the traveling position, the output for the low return control from low return processing section 52 is forcefully stopped. In addition, a revolution speed of primary pulley 1a is monitored on a basis of pulses and, in a case where a peripheral direction slip is detected, the low return control is immediately suspended.

Next, an action of the control apparatus for the hybrid vehicle in this embodiment will be described below with reference to a timing chart of FIG. 3.

Figure 3:
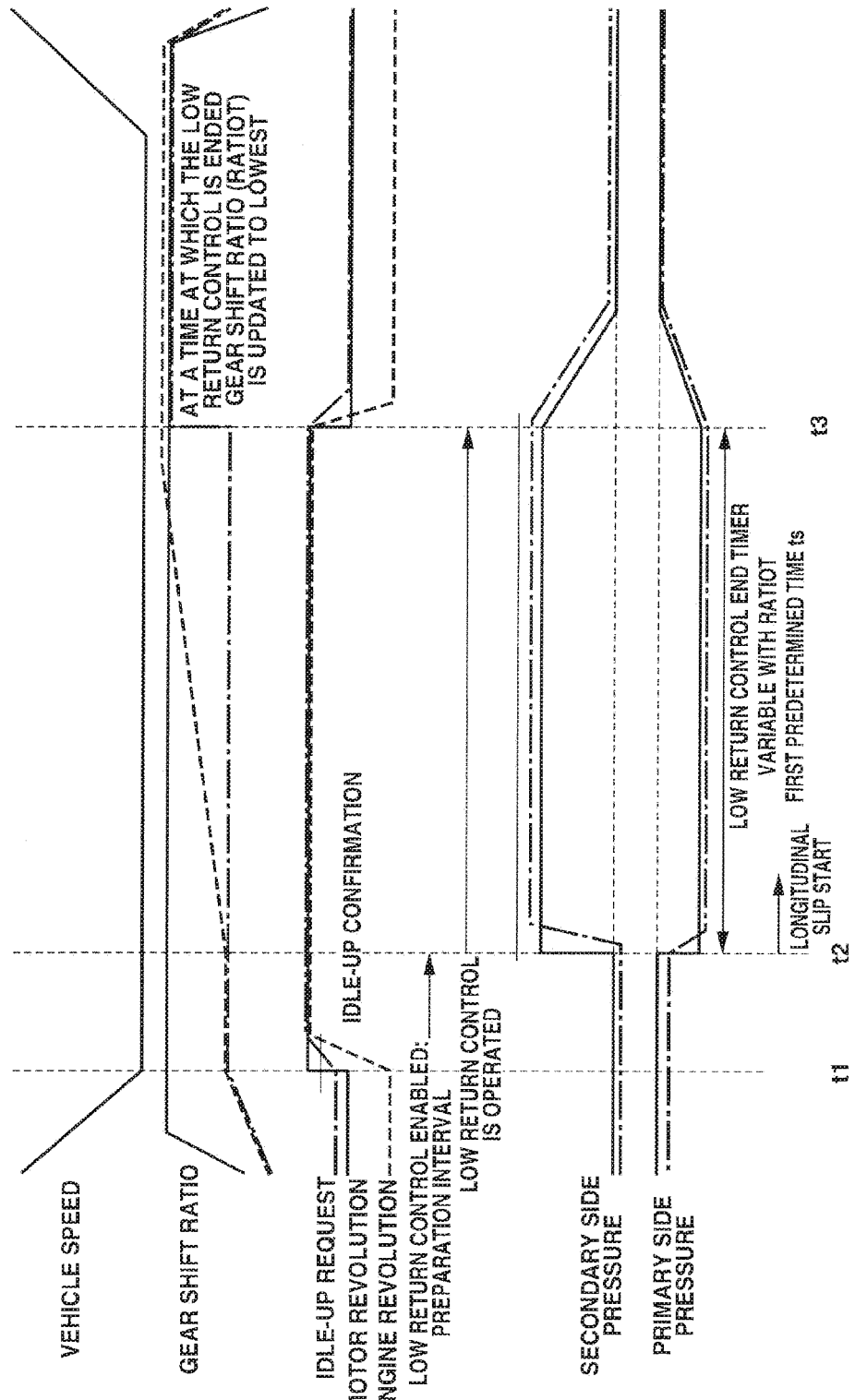
FIG. 3 is a timing chart for explaining an action of the control apparatus in the first preferred embodiment.
Figure 4:
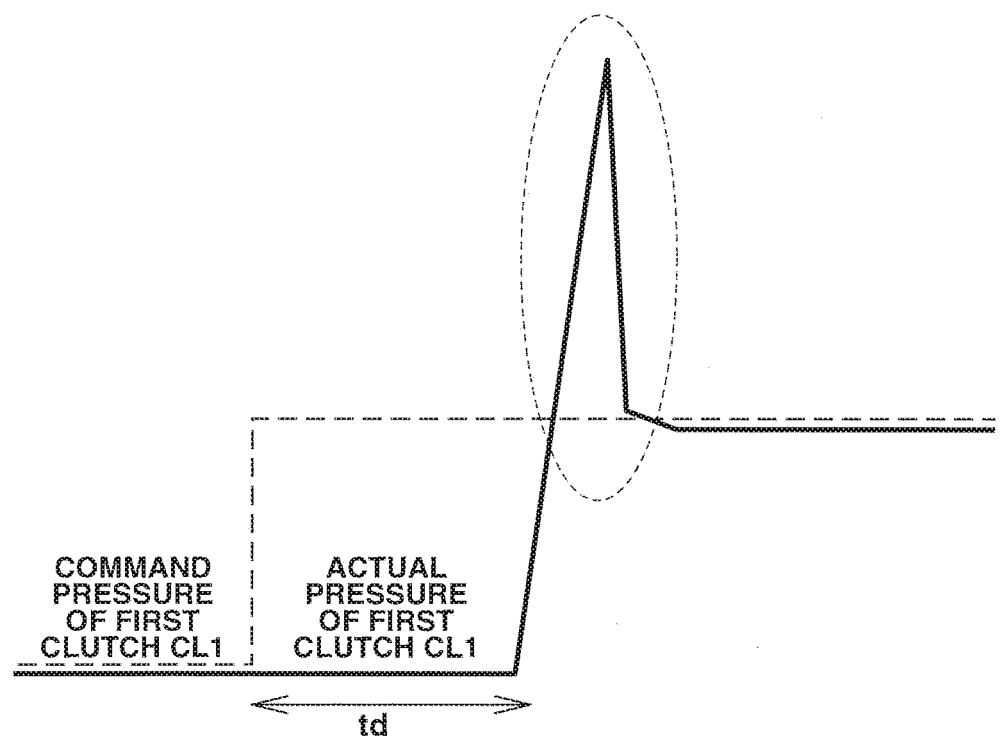
FIG. 4 is a view representing a time variation of a clutch hydraulic pressure for explaining a problem in a conventional control apparatus.

Variations in time of the vehicle speed, the gear (shift) ratio, the idle up request, the revolution of motor M, the engine revolution speed of engine E, the torque down, the second clutch target torque capacity, the second clutch hydraulic pressure, the secondary (side) pulley pressure, and primary pulley (side) pressure are depicted in FIG. 3 sequentially from the upper to the lower.

First, during a time before a time t1, it is a case where the above-described condition for the coast stop is satisfied. During this time, coast stop control section 60 stops the fuel supply to engine E. Since the brake pedal is depressed, an abrupt decrease in the vehicle speed occurs with the passage of time. During this time, the transmission gear ratio of continuously variable transmission 1 is directed toward a low direction so as to become a lowest position before the vehicle is stopped. As is different from a target gear (shift) ratio (denoted in the solid line) directed to move toward the low direction, an actual gear (shift) ratio (denoted in a broken line) does not return toward the lowest position during the stop of the vehicle (time t1) and stops at midway gear (shift) ratio RATIOT.

When the vehicle stop under the coast stop control is detected by low return control start determining section 51, the low return control start signal is inputted to low return processing section 52. Low return processing section 52 inputs a signal to modify the target shift ratio (denoted in a dot-and-dash line) to maintain midway gear shift ratio RATIOT stopped in the midway through the stop from the gear shift ratio which provides the lowest position for the target shift ratio to hydraulic pressure control apparatus 1d immediately at time t1 at which the vehicle stop is detected. In addition, the modification inhibit signals (denoted in the solid line) of primary pulley (side) hydraulic pressure and secondary pulley (side) hydraulic pressure are outputted to suppress the modification of the groove width of pulleys 1a, 1b of continuously variable transmission 1. Hence, continuously variable transmission 1 maintains the midway gear (shift) ratio RATIOT stopped during the vehicle stop.

Low return processing section 52 inputs a signal of restarting engine E with second clutch CL2 controlled in the slip state and an idle up signal (its target value is denoted in the dot-and-dash line) to integrated controller 6. Thus, Engine controller 2 performs a re-start of engine E and an idle up (denoted by the dot-and-dash line). In addition, a revolution limit signal is also inputted from low return processing section 52 to integrated controller 6 so that the revolution speed of engine E is not reduced below a lower limit value. Furthermore, an EV mode inhibit request signal is inputted not to stop engine E. In addition, a revolution request signal of motor M is inputted to integrated controller 6 Thus, motor controller 3 raises motor M up to the revolution speed at which oil pump P can secure a required oil quantity. The interval of time from time t1 to time t2 is a low return control allowance interval of time and is a preparation interval of time for the low return control.

At a time t2 at which the wait time has passed, the low return control is executed.

In this state, the speed of motor M can be increased due to the slip control of second clutch CL2 and oil pump P is speed increase driven so as to provide a required hydraulic pressure for the modification of the groove width of the pulleys. At time point t2, a secondary pulley hydraulic pressure rise signal (denoted in the solid line) and a primary pulley drop signal are inputted to hydraulic pressure control apparatus 1d. Consequently, the actual pressure of secondary pulley 1b (denoted in the dot-and-dash line) is raised and the actual pressure of primary pulley 1a (denoted in the dot-and-dash line) is decreased. These pulleys are not revolved. Hence, the belt is longitudinally slipped due to the variation of the hydraulic pressure so that the actual gear (shift) ratio (denoted in a broken line) gradually approaches to a low side and soon becomes the lowest ratio.

In addition, at a time point of time t2, the timer count is started by means of the normal end timer. When the time has reached to time point t3 at which the timer count reaches to first predetermined time ts, the target gear (shift) ratio is modified to the lowest (transmission gear) ratio from midway (gear shift) ratio RATIOT. As a result of return of the revolution of motor M and idle up to the original state, the actual revolution speed is reduced and becomes constant.

As appreciated from the above-described explanation, the control apparatus for the hybrid vehicle in the first embodiment has the following effects. That is to say, when detecting that the vehicle stop due to the fuel supply stop to engine E by the coast stop, the transmission gear ratio of continuously variable transmission 1 is stopped at a midway transmission gear ratio which is higher than a lowest transmission gear ratio position. In this case, second clutch CL2 is made in the slip state, engine E is restarted, and, thereafter, the midway transmission gear ratio of continuously variable transmission 1 is returned to the low side (the lowest transmission gear position is desirable). Thus, it can be prevented that an overload is acted on the clutch so that the clutch is deteriorated.

In other words, since engine E is previously started before the execution of the control (low return control) such that the transmission gear ratio of continuously variable transmission 1 is returned to the low side, it is not necessary to restart engine E during the execution of the low return control. Thus, even if the required hydraulic pressure in order for the transmission gear ratio to return to the low side during the low return control is not obtained by the driving force of only motor M, engine E is started when the line pressure is in a high state in order for the transmission gear ratio to be returned to the lower side and it is necessary to engage first clutch CL1 in order for the driving force of engine E to be transmitted to oil pump P. Hence, the actual pressure supplied to first clutch CL1 becomes high due to the restart of engine E and due to the operation of first clutch CL1 and the overload applied onto first clutch CL1 can be prevented from occurring.

In addition, the control such that the transmission gear ratio of continuously variable transmission 1 is returned to the low side is ended at an interval of time from a time at which the coast stop control section 60 is detected to be operated and the vehicle is detected to be stopped to a time at which first predetermined time ts is elapsed, the first predetermined time being set in accordance with the midway transmission gear ratio. Thus, the time required for the low return control can appropriately be set.

In addition, low return control section 50 suspends the low return control when the select lever position of continuously variable transmission 1 is operated to the other position than the traveling position during the execution of the low return control or when the peripheral direction slip of the primary pulley of continuously variable transmission 1 is detected. Thus, the low return control is not carried out in a case where it is not necessary to execute the low return control after the vehicle stop.

As described above, the present invention has been explained on a basis of the above-described preferred embodiment. The present invention is not limited to each of these embodiments. The present invention includes even if the design modifications are made within a range not deviated from the gist of the present invention.

For example, in the low return control, a final transmission gear ratio is not the lowest transmission gear ratio but a predetermined transmission gear ratio at a slightly higher side than the lowest transmission gear ratio.

In addition, a role-sharing of each kind of controllers 2, 3, 5, 6 in the preferred embodiment may be differed from those of the preferred embodiment. The plurality of controllers may be united and the number of controllers may be reduced. Furthermore, the continuously variable transmission may be any other type than that in the preferred embodiment.

The invention claimed is:

1. A control apparatus for a hybrid vehicle, the hybrid vehicle having: an engine in which fuel is combusted to enable an output of a driving force; a motor which is enabled to output the driving force by means of an electric power; a continuously variable transmission which is enabled to perform a continuously variable transmission between an input and an output by means of a hydraulic pressure supplied from an oil pump; a clutch disposed between the engine and the motor; and control means for controlling the engine, the motor, the continuously variable transmission, and the clutch, the engine and the motor providing driving sources for the oil pump, the control means comprising:

coast stop control means for stopping a fuel supply to the engine when the vehicle is traveling; and low return control means for returning a transmission gear ratio of the continuously variable transmission to a low side during a stop of the vehicle after the engine is restarted during the stop of the vehicle in a case where the transmission gear ratio of the continuously variable transmission is a transmission gear ratio higher than a predetermined transmission gear ratio, when detecting that the coast stop control means is operated and, thereafter, the vehicle is stopped.

2. The control apparatus for the hybrid vehicle as claimed in claim 1, wherein the predetermined transmission gear ratio is a lowest transmission gear ratio.

3. The control apparatus for the hybrid vehicle as claimed in claim 1, wherein the control of returning the transmission gear ratio of the continuously variable transmission to the low side is ended for an interval of time from a time at which the coast stop control means is operated and the vehicle is detected to be stopped to a time at which a first predetermined time has elapsed, the first predetermined time being set in accordance with the transmission gear ratio which is higher than the predetermined transmission gear ratio.

4. The control apparatus for the hybrid vehicle as claimed in claim 1, wherein the low return control means suspends the low return control when the select position of the continuously variable transmission is operated at a position other than the traveling position during an execution of the low return control or when a peripheral directional slip of a primary pulley of the continuously variable transmission is detected.

* * * * *